United States Patent
Moser

[11] 3,879,615
[45] Apr. 22, 1975

[54] METHOD AND APPARATUS FOR THE RAPID MEASURING OF THE ANGULAR DEPENDENCE OF SCATTERED LIGHT

[75] Inventor: Herbert Moser, Leopoldshafen, Germany

[73] Assignee: Gesellschaft für Kernforschung m.b.H., Karlsruhe, Germany

[22] Filed: Nov. 8, 1973

[21] Appl. No.: 414,126

[30] Foreign Application Priority Data
Nov. 9, 1972 Germany.............................. 2254764

[52] U.S. Cl. ................. 250/574; 356/102; 356/103
[51] Int. Cl. .......................................... G03b 27/06
[58] Field of Search .......... 356/102, 103, 104, 207, 356/208; 250/574, 576

[56] References Cited
UNITED STATES PATENTS

| | | |
|---|---|---|
| 3,279,305 | 10/1966 | Muta................................. 250/574 |
| 3,528,742 | 9/1970 | Dobbs................................ 356/103 |
| 3,603,689 | 9/1971 | Shelnutt............................. 356/103 |
| 3,612,688 | 10/1971 | Liskowitz........................... 250/225 |
| 3,646,352 | 2/1972 | Bol..................................... 356/102 |
| 3,701,620 | 10/1972 | Berkman............................ 356/103 |
| 3,788,744 | 1/1974 | Friedman............................ 356/102 |

Primary Examiner—James W. Lawrence
Assistant Examiner—D. C. Nelms
Attorney, Agent, or Firm—Spencer & Kaye

[57] ABSTRACT

For the rapid measuring of the angular dependence of light scattered from particles in a scattering volume, there is provided a stationarily disposed scattered light detector for receiving a scattered light beam isolated by a slit from a scattered light radiation emanating from the scattering volume in the molecular jet. The scattered light is generated by an exciting laser beam that traverses the scattering volume. By means of a rotating member, either the laser beam or the scattered light is rotated.

14 Claims, 3 Drawing Figures

METHOD AND APPARATUS FOR THE RAPID MEASURING OF THE ANGULAR DEPENDENCE OF SCATTERED LIGHT

BACKGROUND OF THE INVENTION

This invention relates to a method and apparatus for the rapid measuring of the angular dependence of light scattered from small particles, particularly particle clusters contained in a condensated molecular jet. Measuring of this type is effected by means of a scattered light detector and an exciting beam that generates the scattered light.

A known device of the afore-outlined type is described in Gilbert D. Stein *Angular and Wavelength Dependence of the Light Scattered from a Cloud of Particles Formed by Homogeneous Nucleation*, THE JOURNAL OF CHEMICAL PHYSICS, Vol. 51, Number 3, August, 1969, pages 938–942. In the apparatus described in this publication, a laser beam is directed under a constant angle to a cluster beam, while a detector which is mounted on an arm that is swingable about the scattering volume, senses the angular dependence of the scattered radiation. The magnitude of the particles contained in the scattering volume may then be calculated from the sensed angular dependence.

In view of the fact that the angular dependence of light scattered from small particles is to be sensed, for example, as a function of rapidly varying parameters or during a cluster jet pulse lasting only a few milliseconds, it is important to have at disposal a more rapid and rational method that is capable of determining a complete angular dependence in a few milliseconds. By means of the above-outlined known apparatus, the measuring of the angular dependence of scattered light intensity, for example, of cluster jet pulses, lasts approximately 3 hours. A significant acceleration of the measuring process by increasing the rpm of the detector orbiting about the scattering volume has to be excluded at least on the grounds of structural strength considerations.

SUMMARY OF THE INVENTION

It is an object of the invention to provide a method and apparatus of the afore-outlined type with which there is ensured a rapid measuring of the angular dependencies of scattered light for permitting, among others, a rapid determination of the magnitude of particles.

This object and others to become apparent as the specification progresses, are accomplished by one preferred embodiment of the invention according to which, briefly stated, the scattered light detector is held stationary with respect to a main axis of the scattering volume. There are further provided a slit which is disposed in front of the detector for allowing one scattered light beam of the scattered light to pass through and an exciting beam arranged to be rotated in a plane about the scattering volume.

According to another preferred embodiment for accomplishing the object of the invention, the scattered light detector is held stationary with respect to the main axis of the scattering volume. There are further provided an exciting beam arranged to pass through the scattering volume in an arbitrary, but fixed direction, a rotating mirror surface onto which the scattered light is directed by reflecting surfaces and a slit arranged in front of the detector for allowing one scattered beam of the scattered light reflected by the rotary mirror surface to pass through.

A rapid measuring of the angular dependence according to the invention is advantageous, for example, in the manufacture of colloids, since it permits to intervene in the manufacturing process with control or regulating measures.

DESCRIPTION OF THE PREFERRED EMBODIMENTS

Figure 1:
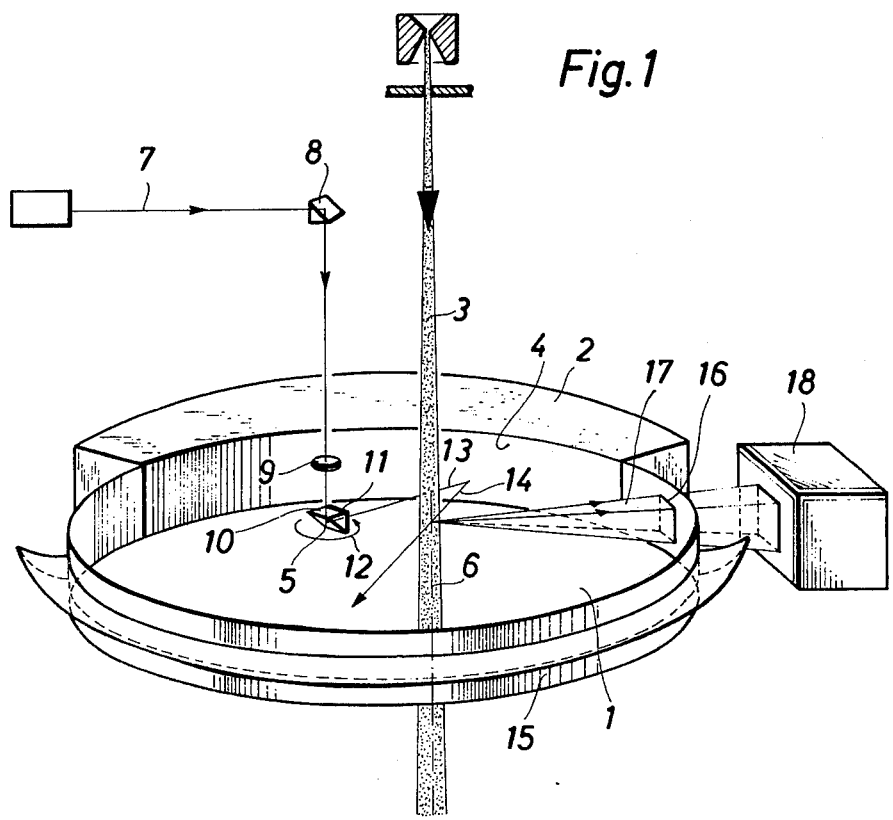
FIG. 1 is a schematic perspective view of a first preferred embodiment of the invention.
Figure 2:
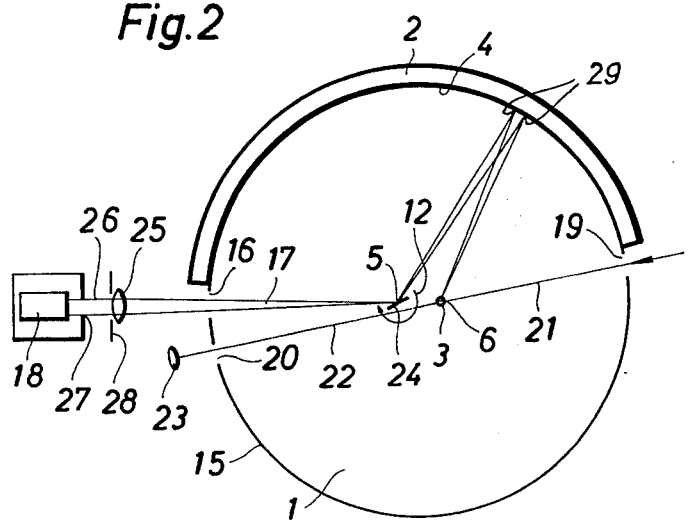
FIG. 2 is a schematic top plan view of a second preferred embodiment of the invention.

The FIG. 1 and 2 embodiments utilize a process of irradiating a scattering volume which is based on the property of an ellipse (elliptical cylinder) according to which a beam emanating from one focus (focal axis) passes, after reflection from the ellipse (elliptical cylinder), through the other focus (focal axis). If now in one focal axis of the elliptical cylinder there is arranged a rotating mirror onto which a laser beam is directed in such a manner that the laser beam intersects the focal axis at its point of impingement with the mirror, then the beam reflected from the ellipitcal cylinder rotates about a point in the second focal axis. Along this second axis, there is passed, for example, a cluster jet. A stationarily mounted scattered light detector then "sees", as a function of time, an angular dependence of the scattered light intensity in proportion to the variation of the angle formed by the rotating laser beam and the stationary direction between the scattering volume and the scattered light detector.

Conversely, it is also possible to direct a non-rotating laser beam onto the scattering volume and, by means of the rotary mirror, reflect the scattered light from various angular ranges onto the stationarily positioned scattered light detector.

An apparatus of the type in which the laser beam rotates is schematically illustrated in FIG. 1. Perpendicularly to a plane 1, there is arranged an elliptical cylinder mirror 2 which surrounds, for example, a cluster jet 3. The elliptical cylinder mirror 2 has a reflecting inner surface 4 and has two focal points or focal axes 5 and 6. The focal axis 6 coincides with the main propagation axis of the cluster jet 3. The cluster jet is a sharply condensed beam which extends preferably normal to the plane 1. The elliptical cylinder mirror 2, or, as the case may be, the used sector thereof, has a small numerical eccentricity which is equal to the quotient of the linear eccentricity and one half of the major axis.

The laser beam 7, which is generated externally of the plane 1, is deflected by means of a prism 8 to extend parallel to the focal axis 5. The laser beam 7 passes through a quarter wave plate 9 before impinging upon a mirror prism 10 provided with a polarizer 11. The latter is positioned at the point of intersection between the focal axis 5 and the plane 1. The mirror prism 10 is adapted to rotate in the afore-noted point of intersection or, as the case may be, in the plane 1 about the focal axis 5. This rotation is symbolized by the arrow 12.

The laser beam 7 which impinges upon the mirror prism 10 is reflected by the latter towrds the reflecting inner surface 4 of the elliptical cylinder mirror 2. The laser beam 13 reflected from the mirror 10, or more accurately, the laser beam portion 14 reflected from the inner surface 4 passes through the cluster jet 3. The remaining space about the cluster jet 3, particularly the space opposite the elliptical cylinder mirror 2, is surrounded by a wall 15, which is formed as a dump or light trap and which absorbs the laser beam 14 after it has passed through the cluster jet 3. By virtue of the collision between the laser beam 14 and the particles in the cluster jet 3, scattered light is generated. Of this scattered light which emanates from the cluster jet 3, a scattered beam 17 is allowed to pass through the wall 15 by virtue of a slit 16 provided therein. The scattered beam 17 enters a scattered light detector 18 disposed externally of the apparatus and in alignement with the slit 16.

In case of a reflection of the linearly polarized laser beam 7 at the mirror prism 10 or, as the case may be, at a rotary mirror without a quarter wave plate 9 and polarizer 11 and at the reflecting inner surface 4 of the elliptical cylinder mirror 2, the angles of incidence and reflection on the surface 4 as well as the position of the electrical field vector with respect to the plane of incidence at the mirror prism 10 are variable. This means that the intensity and the polarized state of the rotating beam 14 is modulated. The influence of the intensity modulation can be eliminated in principle by means of a straight-forward calculation. Besides, for suppressing the intensity modulation, the range of variation of the angle of incidence may be rendered small by appropriate choice of the geometry. Such a choice leads to an ellipse with small numerical eccentricity. Further, the angles of incidence should lie in the range of the smallest variation of the reflection coefficients; that is, they should be close to 90 degrees. This also leads to an ellipse with a small numerical eccentricity.

The problem of the modulation of the polaritation state may be solved according to the invention by combining a quater wave plate 9, the mirror prism 10 and the polarizer 11. The linearly polarized laser beam 7 passes from above along the focal axis 5 through a stationarily mounted quater wave plate 9 which circularly polarizes the laser beam 7. This circularly polarized beam is totally reflected by the rotating mirror prism 10 and leaves the latter in an elliptically polarized state. What is essential in this arrangement is the fact this elliptically polarized condition is, because of the rotational symmetry of the apparatus to the focal axis 5, independent from the angle of rotation. The polarizer 11 glued to the mirror prims 10 converts the elliptically polarized light again into the desired linearly polarized light to thus obtain the light beam 13. The intensity of the light beam 13 is independent from the angle of rotation.

The scattering volume in the cluster jet 3 is formed by the intersection of the cluster jet 3 and the laser beam 14. The dimensions of the scattering volume should be small with respect to its distance from the scattered light detector 18. The scattering volume, however, cannot be predetermined by the optical system of the detector 18, since the volume affected by the traversing and rotating laser beam 13, 14, and the cone of acceptance of the optical system vary with the angle of rotation.

Instead of causing reflections of the laser beam from the mirror prism 10 and from the inner surface 4 of the elliptical cylinder mirror 2, it may be feasible to cause rotation of a laser beam source in a circular path directly about the main radiation axis 6 of the cluster jet 3 in the plane 1 provided the laser beam source can be so structured that no significant centrifugal forces will appear. In such a case the beam emitted by the laser source will be equivalent to the laser beam portion 14 of the FIG. 1 embodiment.

A further embodiment of the invention, in which the incident laser beam is non-rotating, is schematically illustrated in FIG. 2, in which components corresponding to those described in connection with FIG. 1, are designated with identical reference numerals. The elliptical cylinder mirror 2 is, with its reflecting inner surface 4, arranged in the plane 1. Opposite thereto, there is disposed the wall 15 which is formed as a dump or light trap. In the wall 15, there are provided three slits 16, 19 and 20. The scattered light beam 17 is permitted to pass through the wall 15 by virtue of the slit 16 to the scattered light detector 18.

The laser beam 21 enters through the slit 19 in the space surrounded by the elliptical cylinder mirror 2 and the wall 15 and traverses the cluster jet 3 which passes in alignment with the focal axis 6 of the elliptical cylinder mirror 2. It is noted that in FIG. 2 the cluster jet 3 and the focal axis 6 are shown only in section in the plane 1. The laser beam 22 which passes directly through the cluster jet 3 impinges, after passing through the slit 20, on the absorbing glass disc 23 and will be absorbed thereby. The entire scattered light which is generated in the cluster jet 3 and which is scattered from approximately 15 degrees to 170 degrees, is focused in the second focal axis 5 (which is shown only in section in the plane 1). The rotary mirror 24 is arranged coaxially with the focal axis 5. The rotation of the rotary mirror 24 is symbolized by the arrow 12. A lens 25, the focal plane of which contains the focal axis 5, collects the scattered light beam 17 reflected by the rotary mirror 24 and passing through the slit 16 and forms a parallel scattered light beam 26 therefrom. The slit 27 in front of the scattered light detector 18 predetermines the diameter of the light beam 26 impinging upon the detector 18, whereas the slit 28 predetermines the maximum inclination to be optical axis.

In the description that follows, the paraxial light beam 26 will be examined, the diameter of which, as noted earlier, is predetermined by the slit 27. The beam 26 is focused on the rotary mirror 24 with a predetermined opening angle. Subsequent to reflection, it has the same opening angle independent from the position of the rotary mirror 24. By means of the elliptical cylinder mirror 2, the light beam is focused in the focal axis 6 and has there another opening angle which may be calculated from the distances of the point of reflection on the elliptical cylinder mirror 2 from the respective focal axis. The scattering angle obtained in this manner thus varies in proportion to the variation, upon rotation of the rotary mirror 24, of the quotient of the distances from the focal axis 6 to the point of impingement 29 on the inner surface 4 of the cylinder mirror 2 and from the point 29 to the rotary mirror 24. In this manner, the scattered light intensity in the detector 18 is modulated. The influence of this effect may be in principle eliminated by means of a straight-forward calculation or diminished by a small numerical, eccentricity of the elliptical cylinder mirror 2.

The volume from which the scattered light is detected, is determined by observing a second paraxial scattered light beam (not illustrated), the diameter of which is determined also by the slit 27 and which has a given inclination to the optical axis. This light beam is focused in the focal plane of the lens 25. The focused spot still lies on the rotary mirror 24, whereby the latter and the focal plane have only one common straight line, namely the focal axis 5 of the elliptical cylinder mirror 2. The focused spot is, by means of reflection by the elliptical cylinder mirror 2, reproduced in a point which is situated somewhat adjacent the other focal axis 6. Various points of the scattering volume thus generate at the slit 27 differently inclined parallel light beams. The maximum inclination and thus the magnitude of the sensed volume is determined by the second slit 28. The effect of the fact that the plane of the rotary mirror and of the focal plane do not coincide may be diminished by selecting a large focal length for the lens 25.

In order to be able to scan once the entire sector of approximately 160 degrees, the rotary mirror 24 should be able to rotate through an angle of 80 degrees. Typical cluster jet pulses last approximately 4 milliseconds. An angular interval sufficient for determining the angular dependence, namely 80° for the rotating mirror, should therefore be traversed in approximately 1 millisecond. The period of a full revolution is thus approximately 4 milliseconds; that is, the rotary mirror 24 has to revolve with a frequency of 250Hz.

The rotating prism 10, described in connection with FIG. 1, has to turn through an angle of 160 degrees. Thus, at the same motor rpm, two milliseconds are needed to move through the same angle range.

Figure 3:
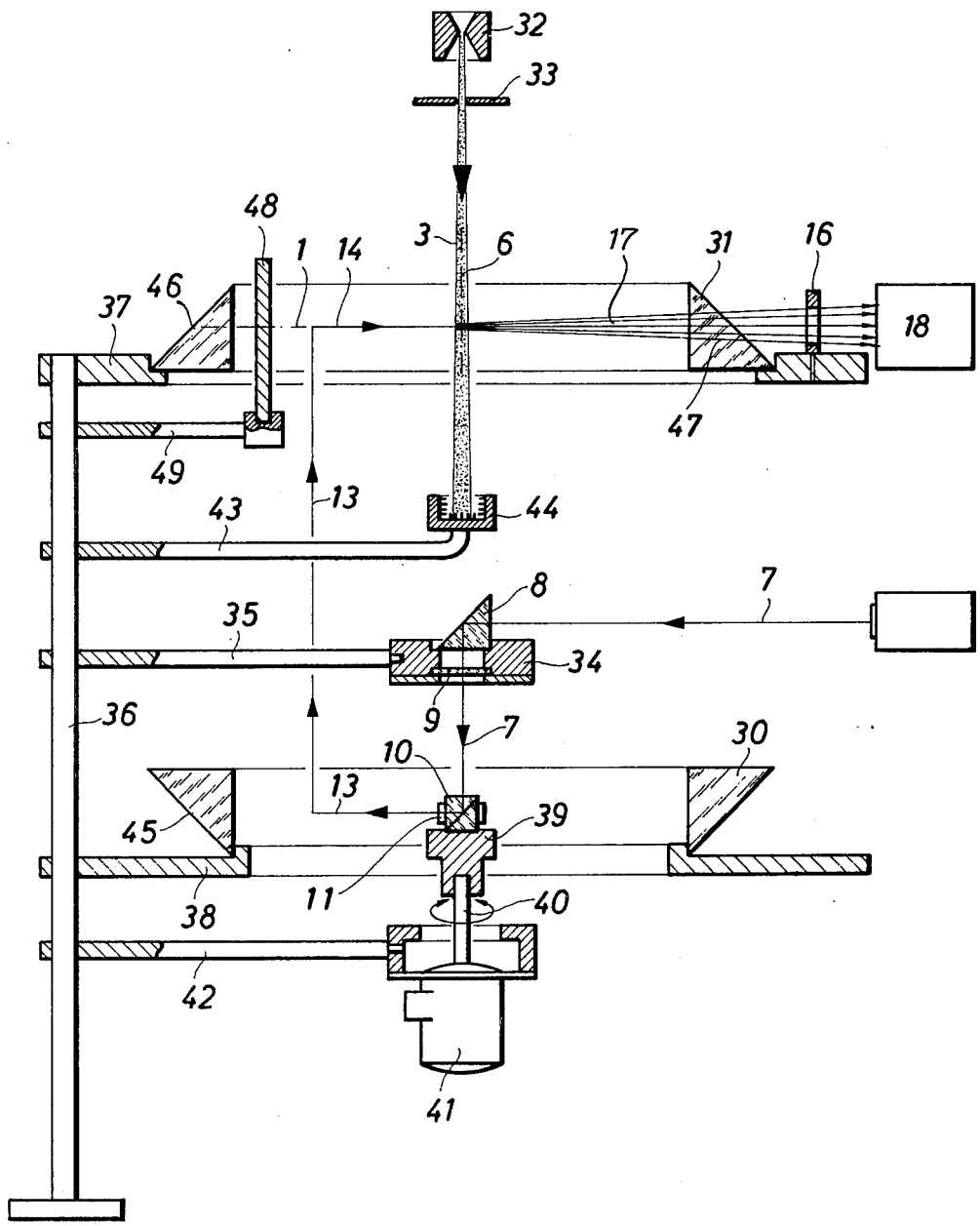
FIG. 3 is a schematic sectional side elevational view of a third preferred embodiment of the invention.

A further embodiment of the invention is illustrated in FIG. 3. This embodiment differs from the FIG. 1 and 2 embodiments in that instead of an elliptical cylinder mirror 2, two conical mirror surfaces are used which are formed by two 90 degrees reflecting prims 30 and 31. These rotationally symmetrical reflecting prisms 30 and 31 may also be formed of axicons having conical non-spherical faces and a central bore. It is a particular advantage of this embodiment as opposed to the elliptical cylinder mirrors 2 that it is significantly more simple to manufacture, it has a lesser spatial requirement, it may be more easily adjusted and it can fully eliminate the intensity modulation of the light beam as a function of the angle of rotation. This apparatus, similar to the FIG. 1 embodiment, is adapted to rotate a laser beam 7, 13, 14 about a predetermined axis (the main propagation axis 6 of the cluster jet 3). It is also possible, however, to make a conversion analogous to that outlined in the second paragraph of the description of the preferred embodiment.

The entire apparatus illustrated in FIG. 3 is cylindrically symmetrical. The scattering volume lies in the cylinder axis which is identical to the main propagation axis 6 of the cluster jet 3. The latter is expanded out of a nozzle 32 and is isolated by means of a diaphragm 33. The laser beam 7 is reflected by menas of a reflecting prism 8 into alignment with the cylinder axis 6; it then passes through the quarter wave plate 9 and impinges upon the rotary reflecting prims 10 which has a polarizer 11 glued thereto. The reflecting prism 8 used for the deflection of the laser beam 7 and the quarter wave plate 9 are positioned in a holder 34 and are affixed by means of a bracket 35 to a holder rod 36. The latter also supports disc-shaped mounts 37 and 38 for the two prisms 31 and 30. The reflecting prism 10 is attached by menas of a support 39 to the rotary shaft 40 of a motor 41. The motor 41, in turn, is attached to the holder rod 36 by a bracket 42. A cup 44, secured to the holder rod 36 by a bracket 43, receives the cluster jet 3 subsequent to its irradiation by the laser beam.

After the laser beam 13 leaves the rotating reflection prism 10, it is, while rotating, reflected from the base 45 of the prism 30. Then, it extends and orbits parallel to the main propagation axis 6 and is subsequently reflected from the base 46 of the other prism 31. Thereafter, as beam portion 14, it rotates as the hand of a watch about the main propagation axis 6.

The scattered light beam 17 to be detected in the detector 18 which is disposed behind the slit 16 passes through a sectorial cutout (slit) 47 provided in the prism 31. Diametrically opposite the slit 47 there is disposed an absorber 48 which is formed as a dump or light trap for scattered light and laser light and which is secured to the support rod 36 by means of a bracket 49.

After the scattering volume in the cluster jet 3 has been traversed by the laser beam, the latter is reflected by the two prisms 31 and 30 back to the prism 10 and therefrom it is directed to the holder 39. The sectorial cutout (slit) 47 in the prism 31 extends through an angle of approximately 20 degrees. The angle between the laser beam 14 and the direction of observation (defined by the slit 47) scans values from approximately 10 degrees to 170 degrees and then from approximately 190 degrees to 350 degrees. Thus, both sides of the angular dependence of scattered light are automatically obtained, whereby the symmetry may be easily checked. By means of the cylindrical symmetry of the prisms 30 and 31, the dependence from the rotary angle is firmly eliminated.

It will be understood that the above description of the present invention is susceptible to various modifications, changes and adaptations, and the same are intended to be comprehended within the meaning and range of equivalents of the appended claims.

What is claimed is:

1. An apparatus for the rapid measuring of the angular dependence of light scattered from a scattering volume containing particles, particularly those forming a cluster jet, which has a main axis, comprising in combination:
    a. means for generating a laser beam;
    b. means for rotating said laser beam in a plane about the scattering volume so that the rotating laser beam is directed into the scattering volume for traversing the same and for generating light scattered by the particles in the scattering volume;
    c. means defining a stationary slit being spaced from said main axis for transmitting a scattered light beam of the scattered light; and
    d. a scattered light detector being stationary with respect to said main axis and in alignment with said slit for receiving therefrom said scattered light beam.

2. An apparatus as defined in claim 1, wherein said plane is normal to said main axis.

3. An apparatus as defined in claim 1, wherein said means for rotating said laser beam includes a rotating member disposed at a distance from said main axis, whereby said laser beam rotatingly emanates from said rotating member; and a reflecting surface intersecting said plane and disposed at least partially about said main axis for reflecting towards the scattering volume, said laser beam emanating from said rotating member.

4. An apparatus as defined in claim 3, wherein said reflecting surface is formed of an elliptical cylinder mirror having a first focal axis contained in said rotating member and a second focal axis coinciding with said main axis of the scattering volume.

5. An apparatus as defined in claim 3, wherein said rotating member is a mirror for reflecting the laser beam, the combination further comprising a quarter wave plate arranged to be traversed by said laser beam for circularly polarizing the same prior to its impingement on said rotating mirror; and a polarizer arranged to be traversed by said laser beam for lineraly polarizing the same subsequent to its reflection by said rotating mirror and prior to traversing the scattering volume.

6. An apparatus as defined in claim 1, wherein said means for rotating said laser beam includes a rotating member from which said laser beam rotatingly emanates; at least one stationarily supported, rotationally symmetrical prism having a reflecting base intersecting said plane and surrounding said main axis, said rotating laser beam is reflected from said base onto said scattering volume.

7. An apparatus as defined in claim 6, including an additional slit provided in said prism and aligned with said scattered light detector for providing a passage for said scattered light beam.

8. An apparatus as defined in claim 6, including means for absorbing said laser beam after it traversed the scattering volume.

9. An apparatus for the rapid measuring of the angular dependence of light scattered from a scattering volume containing particles, particularly those forming a cluster jet which has a main axis, comprising in combination:
a. means for generating a laser beam and for directing the laser beam stationarily into the scattering volume for traversing the same and for generating light scattered by a scattering volume;
b. a stationary reflecting surface disposed at least partially about said main axis for reflecting the scattered light emanating from the scattering volume;
c. a rotating mirror for rotatingly reflecting the scattered light reflected from said stationary reflecting surface;
d. at least one stationarily supported slit disposed space from said rotating mirror for transmitting a scattered light beam of the scattered light rotated by said mirror; and
e. a scattered light detector disposed stationarily with respect to said main axis and in alignment with said slit for receiving therefrom said scattered light beam.

10. An apparatus as defined in claim 9, wherein said reflecting surface is formed of an elliptical cylinder mirror having a first focal axis contained in said rotating mirror, said rotating mirror further contains the point of intersection between said first focal axis and a plane containing both said laser beam and said scattered light beam; said elliptical cylinder mirror further having a second focal axis coinciding with said main axis of the scattering volume.

11. An apparatus for the rapid measuring of the angular dependence of light scattered from particles forming a cluster jet which has a main axis, comprising in combination:
a. means for generating a first, or laser beam for directing it into the cluster jet for traversing the same and for generating light scattered by a scattering volume of the cluster jet;
b. a stationarily supported slit disposed spaced from said main axis for transmitting a scattered light beam of the scattered light, said scattered light beam constituting a second beam;
c. an elliptical cylinder mirror having a first focal axis and a second focal axis, said second focal axis coinciding with said main axis of the cluster jet; one of said first and second beams being reflected by said elliptical cylinder mirror;
d. a rotating member containing said first focal axis and being intersected by a plane containing said laser beam and traversing said main axis, said rotating member causing said one of said first and second beams to rotate; and
e. a scattered light detector disposed stationarily with respect to said main axis and in alignment with said slit for receiving therefrom said scattered light beam.

12. A method for the rapid measuring of the angular dependence of light scattered from particles forming a cluster jet which has a main axis, comprising the following steps:
a. generating a first, or laser beam;
b. directing said laser beam into said cluster jet for traversing the same and for generating light scattered by a scattering volume of the cluster jet;
c. singling out one scattered light beam from the scattered light by a slit, said scattered light beam constituting a second beam;
d. rotating said first beam about said main axis;
e. maintaining said second beam stationary;
f. sensing said scattered light beam by a scattered light detector; and
g. maintaining said detector stationary with respect to said main axis.

13. A method as defined in claim 12, wherein said laser beam passing through said cluster jet has a constant intensity and a constant polarization state.

14. A method for the rapid measuring of the angular dependence of light scattered from particles forming a cluster jet which has a main axis, comprising the following steps:
a. generating a first, or laser beam;
b. directing said laser beam into said cluster jet for traversing the same and for generating light scattered by a scattering volume of the cluster jet;
c. singling out one scattered light beam from the scattered light by a slit, said scattered light beam constituting a second beam;
d. reflecting said second beam;
e. rotating said second beam subsequent to step (d);
f. maintaining said first beam stationary;
g. sensing said scattered light beam by a scattered light detector; and
h. maintaining said detector stationary with respect to said main axis.

* * * * *